United States Patent [19]
Winkler, III

[11] Patent Number: 5,220,986
[45] Date of Patent: Jun. 22, 1993

[54] CHUTE FOR TILT TRAY SORTER

[75] Inventor: LeRoy A. Winkler, III, Stanley, N.C.

[73] Assignee: Mantissa Corporation, Charlotte, N.C.

[21] Appl. No.: 899,336

[22] Filed: Jun. 16, 1992

[51] Int. Cl.$^5$ .............................................. B65G 11/00
[52] U.S. Cl. .................................... 193/25 A; 193/32; 193/38; 193/40
[58] Field of Search ................ 193/2 R, 3, 4, 25 A, 193/25 E, 25 FT, 32, 38, 40, 41, 8

[56] References Cited

U.S. PATENT DOCUMENTS

| | | | |
|---|---|---|---|
| 2,392,289 | 1/1946 | Watter | 193/38 |
| 2,742,288 | 4/1956 | Brunel | 193/38 |
| 2,815,252 | 12/1957 | Baker | 193/38 |
| 3,064,783 | 11/1962 | McClelland, Jr. | 193/38 |
| 3,136,401 | 6/1964 | Atanasoff et al. | 193/32 |
| 3,159,258 | 12/1964 | Magyar | 193/32 |
| 4,362,231 | 12/1982 | Meyer | 193/25 A X |
| 4,529,660 | 7/1985 | Heim | 193/2 R X |
| 4,796,887 | 1/1989 | Sternhagen | 193/2 R X |

Primary Examiner—D. Glenn Dayoan
Attorney, Agent, or Firm—Rhodes, Coats & Bennett

[57] ABSTRACT

An improved discharge chute for a material handling system. The chute includes a generally elongated rectangularly shaped support backing. A sheet of low friction, wear resistant polymeric material is bonded to the upper surface of the support backing. In the preferred embodiment, the polymeric material is high density, textured polyethylene between about 15 and 50 mils in thickness. A second sheet of polymeric material is bonded to the lower surface of the support backing to prevent warping of the backing. A support frame is attached to the support backing for positioning one end of the chute adjacent to the discharge portion of the material handling system and the other end of the chute adjacent to a receiving station. Finally, a pair of dividers attached to the opposite sides of the support backing for confining the goods being discharged by the material handling system. The dividers include opposing legs extending parallel and spaced apart to one another for receiving the adjacent edges of the chute and forming a joint with the upper and lower surfaces of the chute. A second pair of opposing legs receive the adjacent edges of a second chute and forming a joint with the upper and lower surfaces of the second chute.

33 Claims, 2 Drawing Sheets

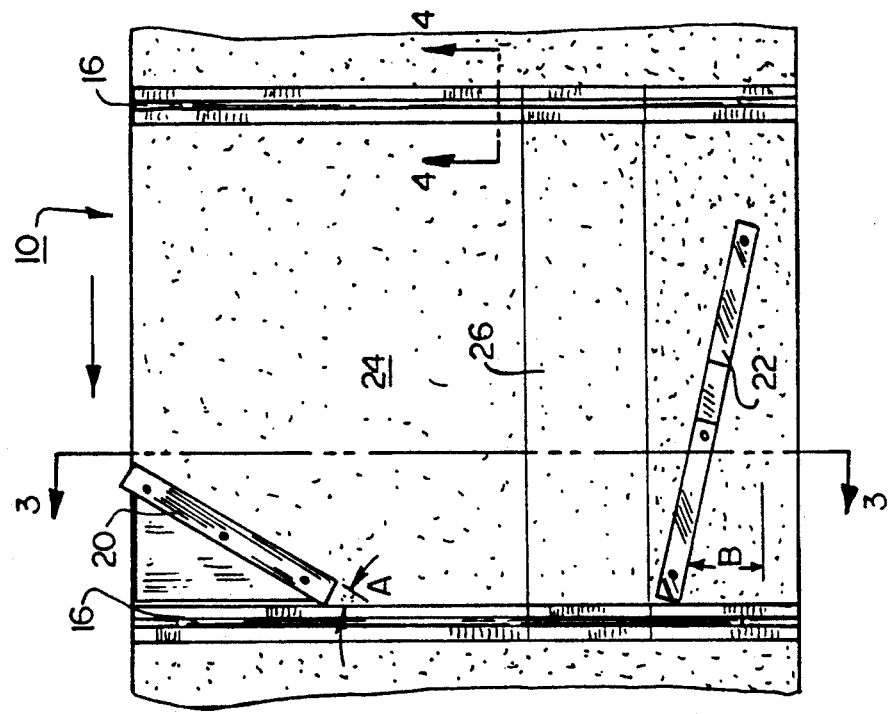
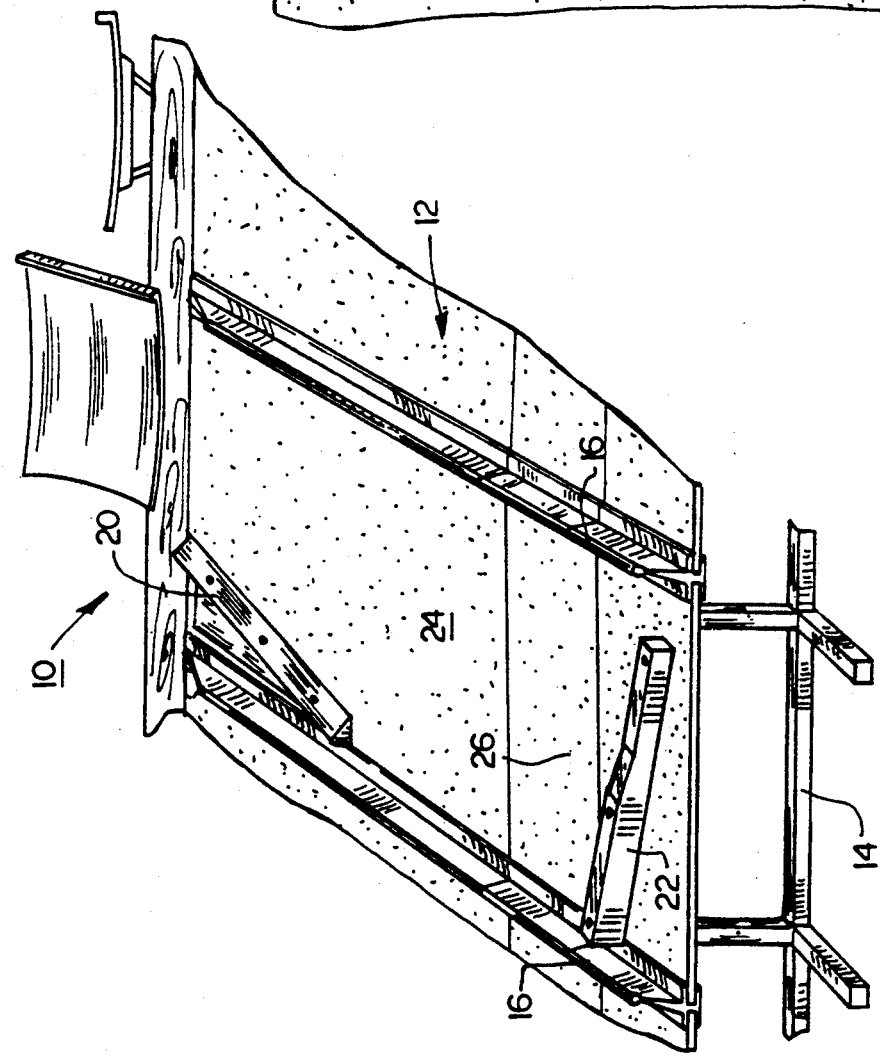

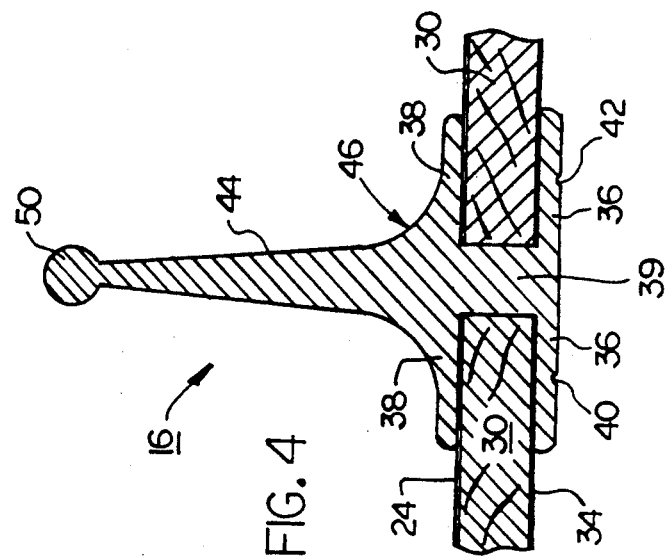
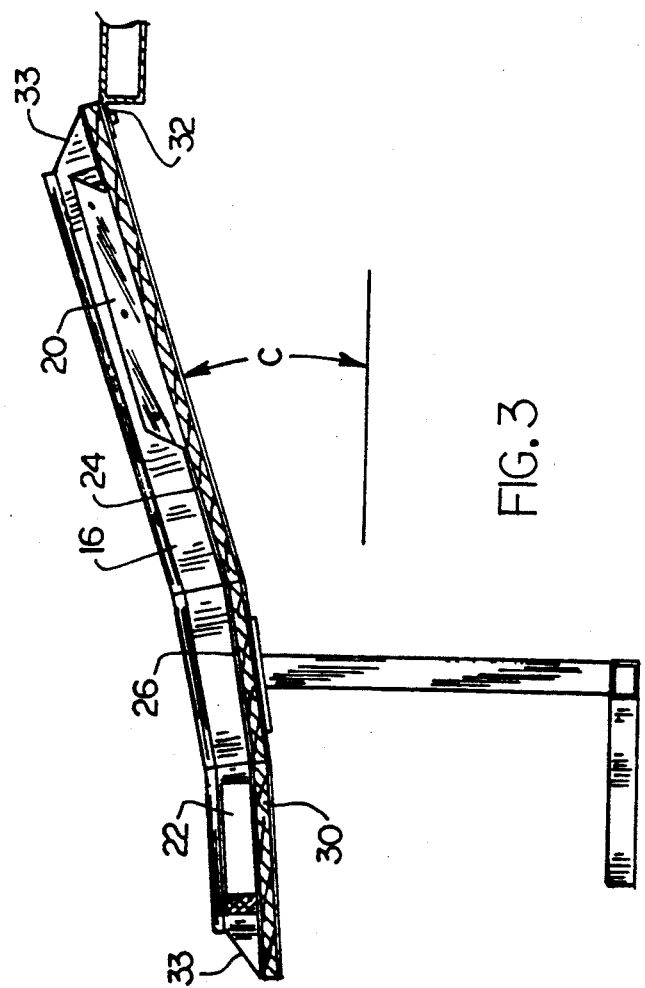

CHUTE FOR TILT TRAY SORTER

BACKGROUND OF THE INVENTION (1) Field of the Invention

The present invention relates generally to material handling systems and, more particularly, to an improved discharge chute for use with tilt tray sorter material handling systems.

(2) Description of the Prior Art

Conventional tilt tray sorters discharge their goods onto individual chutes located near each packer. Usually at least the upper surfaces of the chutes are formed from stainless steel or corrosion resistant aluminum in order to stand up against the constant wear and tear of day in and day out usage.

Unfortunately, because of the frictional properties of metal chutes, it is necessary that the angle of inclination of the chutes be customized depending on the nominal weight of goods being handled by the chute. For example, for plywood chutes, packages weighing greater than 10–30 lbs. require an angle of less than about 25 degrees to slide to the bottom of the chute without damage. However, packages weighing less than 1 lbs. require an angle of more than about 25 degrees to slide to the bottom of the chute without stopping. As a result it has been necessary to go to the expense of custom designing chutes for most material handling applications.

Recently flooring panels have been developed for high traffic use. One such panel is made with a high density textured polyethylene overlay which is bonded to the surface of a plywood substrate with glue. These pane s are sold for warehouse floors, mezzanines and outdoor all weather decks. However, these panels have not previously bee- considered for material handling applications.

Thus, there remains a need for a new and improved chute for material handling applications which is suitable for high usage while, at the same time, is relatively insensitive to the weight of the material being handled, thereby eliminating the need to custom tailor the angle of the chute to the weight of the goods.

SUMMARY OF THE INVENTION

The present invention is directed to an improved discharge chute for a material handling system. The chute includes a generally elongated rectangularly shaped support backing. A sheet of low friction, wear resistant polymeric material is bonded to the upper surface of the support backing. In the preferred embodiment, the polymeric material is high density, textured polyethylene between about 15 and 50 mils in thickness. A second sheet of polymeric material is bonded to the lower surface of the support backing to prevent warping of the backing. A support frame is attached to the support backing for positioning one end of the chute adjacent to the discharge portion of the material handling system and the other end of the chute adjacent to a receiving station. Finally, a pair of dividers attached to the opposite sides of the support backing for confining the goods being discharged by the material handling system.

Also, in the preferred embodiment the dividers include at least one pair of opposing legs extending parallel and spaced apart to one another for receiving the adjacent edges of the chute and forming a joint with the upper and lower surfaces of the chute. A web portion extends between the pair of opposing legs for interconnecting the opposing legs. Finally, a fin portion is aligned with the web portion and extending perpendicular to the opposing legs for confining the goods being discharged by the material handling system onto the chute. A second pair of opposing legs extending parallel and spaced apart to one another for receiving the adjacent edges of a second chute and forming a joint with the upper and lower surfaces of the second chute.

A portion of the divider between the fin portion and at least one of the pair of opposing legs is rounded to lift and decelerate goods being discharged onto the chute. Further a groove in the surface of at least one of the pair of opposing legs generally parallel to and spaced apart from the edge of the legs for receiving a self taping fastener. The fin is tapered and includes a reinforcing rib along the end of the tapered fin.

Finally, the chute further includes an elongated bar having an inclined edge portion attached to the end of the chute adjacent to the discharge portion of the material handling system and adapted to lift and thereby slow goods being discharged onto the chute. The chute also includes a second elongated bar attached to the end of the chute adjacent to the receiving station of the material handling system and adapted to prevent goods being discharged onto the chute from forming an interlocking mass together.

Accordingly, one aspect of the present invention is to provide a discharge chute for a material handling system. The chute includes: (a) a generally elongated rectangularly shaped support backing; (b) a sheet of low friction, wear resistant polymeric material bonded to the upper surface of the support backing; (c) a support frame attached to the support backing for positioning one end of the chute adjacent to the discharge portion of the material handling system and the other end of the chute adjacent to a receiving station; and (d) a pair of dividers attached to the opposite sides of the support backing for confining the goods being discharged by the material handling system.

Another aspect of the present invention is to provide a chute divider for attachment to the opposite sides of a chute receiving goods being discharged by a material handling system onto the chute. The divider includes: (a) at least one pair of opposing legs extending parallel and spaced apart to one another for receiving the adjacent edges of the chute and forming a joint with the upper and lower surfaces of the chute; (b) a web portion extending between the pair of opposing legs for interconnecting the opposing legs; and (c) a fin portion aligned with the web portion and extending perpendicular to the opposing legs for confining the goods being discharged by the material handling system onto the chute.

Still another aspect of the present invention is to provide a discharge chute for a material handling system. The chute includes: (a) a generally elongated rectangularly shaped support backing; (b) a sheet of low friction, wear resistant polymeric material bonded to the upper surface of the support backing; (c) a support frame attached to the support backing for positioning one end of the chute adjacent to the discharge portion of the material handling system and the other end of the chute adjacent to a receiving station; and (d) a pair of dividers attached to the opposite sides of the support backing for confining the goods being discharged by the material handling system. The dividers include: (i) at least one pair of opposing legs extending parallel and spaced apart to one another for receiving the adjacent edges of the chute and forming a joint with the upper and lower surfaces of the chute; (ii) a web portion extending between the pair of opposing legs for interconnecting the opposing legs; and (iii) a fin portion aligned with the web portion and extending perpendicular to the opposing legs for confining the goods being discharged by the material handling system onto the chute.

These and other aspects of the present invention will become apparent to those skilled in the art after a reading of the following description of the preferred embodiment when considered with the drawings.

BRIEF DESCRIPTION OF THE DRAWINGS

FIG. 1 is a front perspective view of a chute constructed according to the present invention;

FIG. 2 is a top plan view of the chute shown in FIG. 1;

FIG. 3 is a vertical cross-sectional view of the chute shown in FIG. 2 taken along line 3—3; and FIG. 4 is an enlarged vertical cross-sectional view of the chute shown in FIG. 2, taken along line 4—4.

DESCRIPTION OF THE PREFERRED EMBODIMENTS

In the following description, like references characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a discharge chute, generally designated 10, is shown constructed according to the present invention. The chute 10 includes three major sub-assemblies: a slide 12; a support frame 14; and at least one pair of chute dividers 16.

In the preferred embodiment, discharge chute 10 includes an elongated bar 20 having inclined edge portion attached to the end of the chute adjacent to the discharge portion of the material handling system. Elongated bar 20 is adapted to lift and thereby slow goods being discharged onto the slide 12. Also in the preferred embodiment, chute 10 further includes a second elongated bar attached to the end of the chute adjacent to the receiving station of the material handling system and adapted to prevent goods being discharged onto the chute from forming an interlocking mass together.

A sheet of low friction, wear resistant polymeric material 24 is bonded to the upper surface of slide 12. In the preferred embodiment, polymeric material is a high density polyethylene. One source of such a high density polyethylene overlaid panel is manufactured by Medalist M & S of Vancouver, Wash. Preferably, the polymeric material is between 15-50 mils in thickness.

It has been surprisingly discovered that, unlike conventional metallic slides, the use of a sheet of low friction, wear resistant polymeric material bonded to the upper surface of the slide 12 permits the chute to be used for a wide variety of weight of goods without the necessity of changing the angle of inclination between the end of the chute adjacent to the receiving station and the end of the chute adjacent to the discharge portion of the material handling system. This phenomena is set out in the following tests. All tests were conducted on 16 foot long sections of chute from a dead stop. The data is the average of ten consecutive tests for each weight, angle and material.

TABLE 1

| Weight of Goods | Angle of Inclination | Speed (fps) Polymer | Plywood | Steel |
|---|---|---|---|---|
| 1 oz. | 16 | 3.35 | 0.0 | 0.0 |
| | 17.5 | 4.35 | 0.0 | 0.0 |
| | 20 | 4.35 | 0.0 | 3.58 |
| | 25 | 6.87 | 0.0 | 6.35 |
| 1 lb. | 16 | 4.27 | 0.0 | 0.0 |
| | 17.5 | 4.73 | 0.0 | 0.0 |
| | 20 | 6.30 | 0.0 | 2.16 |
| | 25 | 6.67 | 0.0 | 5.16 |
| 10 lb. | 16 | 5.35 | 0.0 | 0.0 |
| | 17.5 | 6.18 | 0.0 | 0.0 |
| | 20 | 6.99 | 0.0 | 4.07 |
| | 25 | 7.66 | 5.69 | 6.43 |
| 15 lb. | 16 | 5.26 | 0.0 | 0.0 |
| | 17.5 | 6.23 | 0.0 | 0.0 |
| | 20 | 6.78 | 0.0 | 4.48 |
| | 25 | 8.51 | 5.88 | 6.32 |
| 30 lb. | 16 | 5.08 | 0.0 | 0.0 |
| | 17.5 | 5.93 | 0.0 | 2.58 |
| | 20 | 6.15 | 0.0 | 4.42 |
| | 25 | 8.51 | 4.42 | 6.61 |

As can be seen, plywood is completely useless for weights of less than 10 lbs. and angles of less than 25 degrees. Similarly, mild steel must have an angle of greater than about 20 degrees for goods up to about 30 lbs. Only the chute formed from the polymeric material produced satisfactory results over the entire range of the tests. In addition, the speed of the polymer chute was relatively independent of the weight of goods, especially between 1 and 30 lbs., up to an angle of about 25 degrees.

While it is not fully understood why this phenomena occurs, one possible explanation is that the textured surface of the polymeric material deforms the contacting surface of the package for higher weight items thereby increasing the surface contact between the item and the polymeric material. As a result, friction is increased for higher weight bodies. Similarly, the contacting surface of lower weight goods are not deformed and, therefore, only have partial contact with the surface of the material. On the other hand, an alternative explanation might be that the coefficient friction of the polymeric material is so low that there is little effect of the weight of the material on the speed the goods travel down the discharge chute.

Whatever the mechanism may be, the present invention allows the range of the angle of incline to be further broadened over conventional chutes to an angle of between about 16-25 degrees. This flexible range permits the use of essentially one design for all chute systems regardless of the weight of the goods, thereby eliminating the need to prepare customized, one-of-a-kind designs for each site.

Finally, in the preferred embodiment, the lower portion of slide 12 adjacent to elongated bar 20 is formed into a washout portion 26 for slowing the speed of the discharge goods. Preferably the transitions are at an angle of about 5 degrees each.

As best seen by the top plan view of the chute 10 shown in FIG. 1, elongated bar 20 is oriented at an angle "A" of about 20 degrees with respect to divider 16 attached to the downstream edge of slide 12. Furthermore, in the preferred embodiment, the inclined edge portion of bar 20 is oriented at an angle of about 30 degrees. Also preferably the inclined edge portion is formed from ultra high molecular weight polyethylene (UHMWP).

As can also be seen in FIG. 2, elongated bar 22 is oriented at an angle "B" of about 10 degrees with respect to the downside edge of the slide 12. This slight deviation from squareness is sufficient to prevent goods from being discharged onto chute 10 from forming an interlocking mass together due to the typical squareness of individual goods.

Turning to FIG. 3, there is shown a sectional view of the chute shown in FIG. 2 taken along lines 3—3. As can be seen, chute 10 includes a plywood support backing 30 attached at its upper end to the discharge portion of material handling system by upper support bracket 32. The lower end of plywood support backing 30 is supported by tubular frame 14. As previously discussed, in the preferred embodiment, the angle of inclination "C" is between 16-25 degrees with 20 degrees being the most preferred. Also in the preferred embodiment, the ends 33 of chute divider 16 are tapered to provide clearance with respect to the tilt Finally, an enlarged sectional view of the chute 10 taken along lines 4—4 in FIG. 2 is shown in FIG. 4. As can be seen, in the preferred embodiment, a second sheet of polymeric material 34 is bonded to the lower surface of the support backing 30 to prevent warping of the backing over time. As can also be seen, divider 16 includes pairs of adjacent edges of slide 12 and forming a joint with the upper and lower surfaces of the slide. A web portion 39 extends between each pair of opposing legs for interconnecting the opposing legs. A pair of grooved screw guides 40,42 extend into the lower surface of the bottom legs. These grooves permit the precise positioning of self-tapping, threaded fasteners which attach divider 16 to backing support 30. Preferably, fin 44 is tapered and there is a radius portion 46 formed by the intersection of fin 44 and upper legs 38. Also in the preferred embodiment, the upper edge of fin 44 is formed into a reinforcing rib having a generally circular cross-section. The use of the rib provides increased strength and allows a thinner cross-section fin to be used. This permits the chutes to be more closely arranged with respect to one another.

Certain modifications and improvements will occur to those skilled in the art upon reading of the foregoing description. It should be understood that all such modifications and improvements have been deleted herein for the sake of conciseness and readability but are properly within the scope of the following claims.

I claim:

1. A discharge chute for a material handling system, said chute comprising:
   (a) a generally elongated rectangularly shaped support backing, wherein said support backing is formed from plywood;
   (b) a sheet of low friction, wear resistant polymeric material bonded to the upper surface of said support backing and further including a second sheet of polymeric material bonded to the lower surface of said support backing to prevent warping of said backing;
   (c) a support frame attached to said support backing for positioning one end of said chute adjacent to the discharge portion of said material handling system and the other end of said chute adjacent to a receiving station; and
   (d) a pair of dividers attached to the opposite sides of said support backing for confining the goods being discharged by the material handling system.

2. The chute according to claim 1, wherein said polymeric material is high density polyethylene.

3. The chute according to claim 2, wherein said polymeric material is between about 15 and 50 mils in thickness.

4. The chute according to claim 1, wherein the angle of incline between the end of said chute adjacent to the receiving station and the end of said chute adjacent to the discharge portion of said material handling system is between about 16 and 25 degrees.

5. The chute according to claim 1, further including a washout portion at the end of said chute adjacent to the receiving station of said material handling system for slowing the speed of the discharged goods.

6. A discharge chute for a material handling system, said chute comprising:
   (a) a generally elongated rectangularly shaped support backing;
   (b) a sheet of low friction, wear resistant polymeric material bonded to the upper surface of said support backing;
   (c) a support frame attached to said support backing for positioning one end of said chute adjacent to the discharge portion of said surface of said support backing and further including a second sheet of polymeric material bonded to the lower surface of said support backing to prevent warping of said backing;
   (c) a support frame attached to said support backing for positioning one end of said chute adjacent to the discharge portion of said material handling system and the other end of said chute adjacent to a receiving station; and
   (d) a pair of dividers attached to the opposite sides of said support backing for confining the goods being discharged by the material handling system.

7. The chute according to claim 6, wherein said elongated bar having an inclined edge portion attached to the end of said chute adjacent to the discharge portion of said material handling system is oriented at an angle of about 20 degrees with respect to the divider attached to the downstream edge of said chute.

8. The chute according to claim 6, wherein said inclined edge portion is oriented at an angle of about 30 degrees.

9. A discharge chute for a material handling system, said chute comprising:
   (a) a generally elongated rectangularly shaped support backing;
   (b) a sheet of low friction, wear resistant polymeric material bonded to the upper surface of said support backing;
   (c) a support frame attached to said support backing for positioning one end of said chute adjacent to the discharge portion of said material handling system and the other end of said chute adjacent to a receiving station;
   (d) a pair of dividers attached to the opposite sides of said support backing for confining the goods being discharged by the material handling system; and
   (e) an elongated bar attached to the end of said chute adjacent to the receiving station of said material handling system and adapted to prevent goods being discharged onto said chute from forming an interlocking mass together.

10. The chute according to claim 9, wherein said elongated bar attached to the end of said chute adjacent to the receiving station of said material handling system is oriented at an angle of about 10 degrees with respect to the downside edge of said chute.

11. A chute divider for attachment to the opposite sides of a chute receiving goods being discharged by a material handling system onto said chute, said divider comprising:
   (a) at least one pair of opposing legs extending parallel and spaced apart to one another for receiving the adjacent edges of said chute and forming a joint with the upper and lower surfaces of said chute;
   (b) a web portion extending between said pair of opposing legs for interconnecting the opposing legs; and
   (c) a fin portion aligned with said web portion and extending perpendicular to said opposing legs for confining the goods being discharged by the material handling system onto said chute.

12. The chute divider according to claim 11, further including a second pair of opposing legs extending parallel and spaced apart to one another for receiving the adjacent edges of a second chute and forming a joint with the upper and lower surfaces of said second chute.

13. The chute divider according to claim 11, wherein the portion of said divider between said fin portion and at least one of said pair of opposing legs is rounded to lift and decelerate goods being discharged onto said chute.

14. The chute divider according to claim 11, further a groove in the surface of at least one of said pair of opposing legs generally parallel to and spaced apart from the edge, of said legs for receiving a self taping fastener.

15. The chute divider according to claim 11, wherein said fin is tapered.

16. The chute divider according to claim 15, further including a reinforcing rib along the end of said tapered fin.

17. A discharge chute for a material handling system, said chute comprising: '(a) a generally elongated rectangularly shaped support backing;
   (b) a sheet of low friction, wear resistant polymeric material bonded to the upper surface of said support backing;
   (c) a support frame attached to said support backing for positioning one end of said chute adjacent to the discharge portion of said material handling system and the other end of said chute adjacent to a receiving station; and
   (d) a pair of dividers attached to the opposite sides of said support backing for confining the goods being discharged by the material handling system, said dividers including: (i) at least one pair of opposing legs extending parallel and spaced apart to one another for receiving the adjacent edges of said chute and forming a joint with the upper and lower surfaces of said chute; (ii) a web portion extending between said pair of opposing legs for interconnecting the opposing legs; and (iii) a fin portion aligned with said web portion and extending perpendicular to said opposing legs for confining the goods being discharged by the material handling system onto said chute.

18. The chute according to claim 17, wherein said polymeric material is high density polyethylene.

19. The chute according to claim 18, wherein said polymeric material is between about 15 and 50 mils in thickness.

20. The chute according to claim 17, wherein said support backing is formed from plywood.

21. The chute according to claim 20, further including a second sheet of polymeric material bonded to the lower surface of said support backing to prevent warping of said backing.

22. The chute according o claim 17, wherein the angle of incline between the end of said chute adjacent to the receiving station and the end of said chute adjacent to the discharge portion of said material handling system is between about 16 and 25 degrees.

23. The chute according to claim 17, further including an elongated bar having an inclined edge portion attached to the end of said chute adjacent to the discharge portion of said material handling system and adapted to lift and thereby slow goods being discharged onto said chute.

24. The chute according o claim 21, wherein said elongated bar having an inclined edge portion attached to the end of said chute adjacent to the discharge portion of said material handling system is oriented at an angle of about 20 degrees with respect to the divider attached to the downstream edge of said chute.

25. The chute according to claim 21, wherein said inclined edge portion is oriented at an angle of about 30 degrees.

26. The chute according to claim 17, further including an elongated bar attached to the end of said chute adjacent to the receiving station of said material handling system and adapted to prevent goods being discharged onto said chute from forming an interlocking mass together.

27. The chute according to claim 26, wherein said elongated bar attached to the end of said chute adjacent to the receiving station of said material handling system is oriented at an angle of about 10 degrees with respect to the downside edge of said chute.

28. The chute according to claim 17, further including a washout portion at the end of said chute adjacent to the receiving station of said material handling system for slowing the speed of the discharged goods.

29. The chute according to claim 17, further including a second pair of opposing legs extending parallel and spaced apart to one another for receiving the adjacent edges of a second chute and forming a joint with the upper and lower surfaces of said second chute.

30. The chute according to claim 17, wherein the portion of said divider between said fin portion and at least one of said pair of opposing legs is rounded to lift and decelerate goods being discharged onto said chute.

31. The chute according to claim 17, further a groove in the surface of at least one of said pair of opposing legs generally parallel to and spaced apart from the edge of said legs for receiving a self taping fastener.

32. The chute according to claim 17, wherein said fin is tapered.

33. The chute according to claim 32, further including a reinforcing rib along the end of said tapered fin.

* * * * *